Patented Jan. 16, 1934

1,943,948

UNITED STATES PATENT OFFICE 1,943,948

PRODUCTION OF RAW MATERIALS FOR THE MANUFACTURE OF IRON RED DRY COLORS

James B. Castner, Woodbury, and Raymond W. Powers, Arlington, N. J., assignors to E. I. du Pont de Nemours & Company, Wilmington, Del., a corporation of Delaware No Drawing. Application March 7, 1930
Serial No. 434,159

12 Claims. (Cl. 134—59)

This invention relates to the production of raw material suitable for calcination for the manufacture of iron red dry colors. More particularly the invention relates to a process of obtaining material of this kind from the residues of organic or inorganic processes, or both.

Iron oxide reds of various grades are by far the most widely used of all the inorganic red pigments. They consist essentially of ferric oxide in a finely divided state of purities varying from 10 to 95% $Fe_2O_3$. The lower grades are usually known as ochres and contain large amounts of inert material such as silica. In general the high purity material is made by the calcination of copperas, a by-product obtained in the cleaning of steel with sulfuric acid. The lower grades occur usually as natural ores.

Various patents have been taken out for the production of such iron reds. As far back as 1887 LeDoux (U. S. Patent 360,967) treated natural ores or pyrites cinder with sulfuric acid. His patent can only be interpreted as using sufficient sulfuric acid to convert all of the iron present into sulfates. Subsequent to LeDoux there have been numerous patents covering the treating of natural iron ores or products resulting from processing them, with sulfuric acid, the ultimate intention being the production of iron red pigments. In all of these, however, sulfuric acid sufficient to form normal sulfates with all of the iron present is intended.

In more recent years due to large expansion in the steel industry copperas has been so cheap as to prohibit the use of sulfuric acid in connection with natural iron compounds. This is due to the fact that with the same sulfuric acid a purer pigment can be made when dissolving steel than when treating a natural ore. The only extra step necessary to recover copperas crystals is the evaporation and crystallization of the spent pickle liquor, a step involving only small expense.

As more recent patents in this field may be cited U. S. 1,428,521 and 1,455,060 to C. L. Bacon. These patents cover the production of pigments from various iron-bearing materials among others being the sludge produced by the reduction of nitrobenzene to aniline with iron. Here again the theoretical amount of sulfuric acid is used to convert all the iron present into the corresponding sulfates.

In general, amine compounds are produced by the reduction of the corresponding nitrocompound by means of iron with or without a catalyst. Examples of such amine compounds are aniline, toluidine, and phenylene-diamine. As a specific example we refer to the case of aniline. Here a mixture of nitric and sulfuric is used to nitrate benzol. Such proportions are required that a pound of nitrobenzol produces a pound of spent acid, which at a normal strength of 70% is equivalent to 0.7 lbs. $H_2SO_4$. In turn a pound of aniline requires the use of 1.35 lbs. of nitrobenzol and corresponds therefore to 1.35 lbs. gross waste acid or .95 lbs. $H_2SO_4$. There is required for the reduction, sufficient iron to produce 1.87 lbs. of $Fe_3O_4$. This amount of $Fe_3O_4$ would require 3.17 lbs. of $H_2SO_4$ to convert it to the corresponding sulfates while only 0.95 lbs. or 30% is available from the operation. To convert therefore according to the Bacon patents would require the use of large amounts of extra sulfuric acid. In fact as much acid would be used as for the same amount of iron in the form of copperas. As previously explained it is not economical to operate in this manner particularly since a fair credit could be obtained for the sludge as made when sold as a substitute for iron ore.

An object of our invention is the production of raw materials for the manufacture of iron red dry colors. Another object of our invention is the production of such materials from sludges obtained in the reduction of organic nitro-compounds by metallic iron. A further object of our invention is the production of such materials with the aid of waste compounds from other chemical processes. Other objects will appear hereinafter.

As a result of a large number of experiments we have found that it is not necessary to use the theoretical amount of sulfuric acid corresponding to the iron present in order to produce salable pigments of proper strength and shade and of a purity of 95% $Fe_2O_3$. According to our process only the acid produced as above outlined namely 30% of theory is necessary for action with the sludge produced to give the desired product.

In our new method the resulting reduction sludge either dry or wet may be used. We prefer to use the dried material, however, since with it reaction and setting occur much more quickly for the removal of the extra water is not necessary. The spent acid resulting from the nitration of benzol has approximately the composition: 70 sulfuric, 1 nitric, 29 water. We have found that it is not necessary to denitrate this acid before use. According to our process a representative mix would consist of approximately 1,000 lbs. of dry sludge and 700 lbs. of spent acid; that is, in the ratio of 1.87 to 1.35. The sludge is placed in a suitable mixer and the acid added. If the acid is cold it is desirable to use steam on the mixer jacket to start the reaction. This may be avoided by the use of hot acid, that is temperatures around 200° F. The reaction for a time is quite violent and considerable heat is generated. During this stage in the process, water vapors and oxides of nitrogen are given off. When reaction has subsided cooling water is applied to the jacket with continued operation of the mixer until setting takes place, when it is possible to discharge the mix as a hard friable product. The material is in such a condition that it may be ground at once to the desired size and calcined.

Treated sludge made in the above described manner is a hard gray black solid containing normal and basic ferrous and ferric sulfates and possibly some free magnetic oxide. When calcined for the proper time and at suitable temperatures it loses approximately 42% of its weight mainly as water and oxides of sulfur. The residue of 58% contains 95% of finely divided ferric oxide and is highly desirable as an iron oxide red dry color.

A consideration of the foregoing will suggest many obvious advantages of this new process. In the first place, all of the spent acid from benzol nitration is absorbed without the necessity for denitration, an expensive step due to the low nitric content. Secondly, the amount of sulfuric used is such that the finished product can compete with some pigments produced from copperas. An added advantage lies in the higher ignition residue, namely, 58% as against 27% for copperas. This fact results in a saving in freight on raw material and doubles the production of a given calcination unit thereby reducing labor and fuel costs. A still further advantage lies in the reduction of a fume nuisance; that is, the production of a definite amount of pigment by our process produces only one-third the acid fumes resulting from the production of an equal amount from copperas.

To one skilled in the art, it will be apparent that various modifications may be made in the foregoing process without departing from the spirit of the invention. We, therefore, intend to limit ourselves only to the extent indicated in the following patent claims.

We claim:

1. A process for the production of a raw material suitable for calcination to produce iron red dry colors which comprises reacting the sludge formed by the reduction of aromatic nitrocompounds to amines by iron with an amount of sulfuric acid substantially less than the chemical equivalent of the iron present, and setting the resulting mixture.

2. A process for the production of a raw material suitable for calcination to produce iron red dry colors which comprises reacting the sludge formed by the reduction of aromatic nitrocompounds to amines by iron with an amount of cold sulfuric acid substantially less than the chemical equivalent of the iron present, heating the mixture to start chemical action, and cooling it thereafter to cause setting.

3. A process for the production of a raw material suitable for calcination to produce iron red dry colors which comprises reacting the sludge formed by the reduction of aromatic nitrocompounds to amines by iron with an amount of hot sulfuric acid substantially less than the chemical equivalent of the iron present, and setting the reacted mixture by cooling.

4. A process for the production of a raw material suitable for calcination to produce iron red dry colors which comprises reacting the sludge formed by the reduction of aromatic nitrocompounds to amines by iron with an amount of hot sulfuric acid chemically equivalent to from 20 to 60% of the iron present, and setting the reacted mixture.

5. A process for the production of a raw material suitable for calcination to produce iron red dry colors which comprises reacting the sludge formed by the reduction of aromatic nitrocompounds to amines by iron with an amount of hot sulfuric acid chemically equivalent to from 30 to 50% of the iron present and setting the reacted mixture by cooling.

6. A process for the production of a raw material suitable for calcination to produce iron red dry colors which comprises reacting sludge formed by the reduction of aromatic nitrocompounds to amines by iron with an amount of hot sulfuric acid obtained as a by-product of the nitration of benzol, chemically equivalent to from 30 to 50% of the iron present, and setting the reacted mixture by cooling.

7. A process for the production of a raw material suitable for calcination to produce iron red dry colors which comprises reacting the sludge formed by the reduction of nitrobenzol to aniline by iron with an amount of sulfuric acid substantially less than the chemical equivalent of the iron present, and setting the resulting mixture.

8. A process for the production of a raw material suitable for calcination to produce iron red dry colors which comprises reacting the sludge formed by the reduction of nitrobenzol to aniline by iron with an amount of cold sulfuric acid substantially less than the chemical equivalent of the iron present, heating the mixture to start chemical action, and cooling it thereafter to cause setting.

9. A process for the production of a raw material suitable for calcination to produce iron red dry colors which comprises reacting the sludge formed by the reduction of nitrobenzol to aniline by iron with an amount of hot sulfuric acid substantially less than the chemical equivalent of the iron present, and setting the resulting reacted mixture by cooling.

10. A process for the production of a raw material suitable for calcination to produce iron red dry colors which comprises reacting the sludge formed by the reduction of nitrobenzol to aniline by iron with an amount of hot sulfuric acid, chemically equivalent to from 20 to 60% of the iron present, and setting the reacted mixture by cooling.

11. A process for the production of a raw material suitable for calcination to produce iron red dry colors which comprises reacting the sludge formed by the reduction of nitrobenzol to aniline by iron with an amount of hot sulfuric acid, chemically equivalent to from 30 to 50% of the iron present, and setting the reacted mixture by cooling.

12. A process for the production of a raw material suitable for calcination to produce iron red dry colors which comprises reacting the sludge formed by the reduction of nitrobenzol to aniline by iron with an amount of hot sulfuric acid obtained as a by-product in the nitration of benzol, chemically equivalent to 30 to 50% of the iron present, and setting the reacted mixture by cooling.

JAMES B. CASTNER.
RAYMOND W. POWERS.